G. G. GREENWOOD.
STUD MOUNTING FOR STEAM BOILERS AND THE LIKE.
APPLICATION FILED MAR. 8, 1916.
1,194,169.
Patented Aug. 8, 1916.
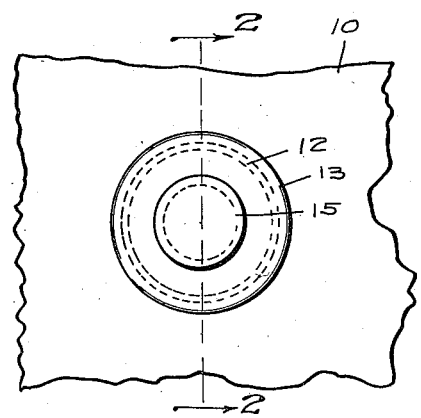
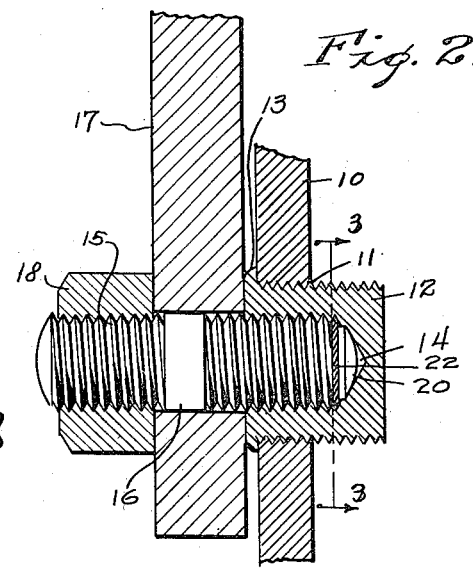
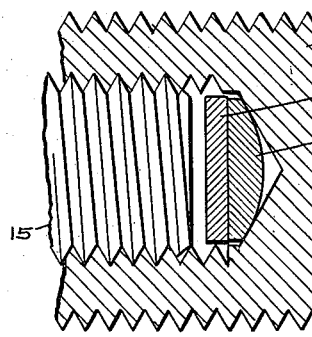
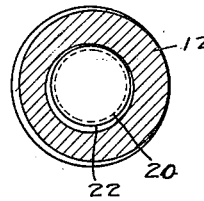
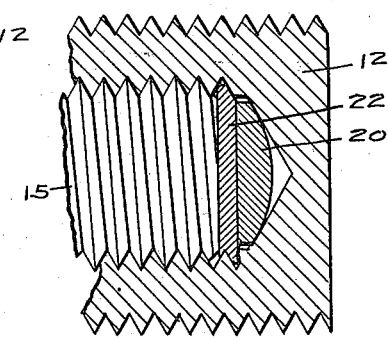
WITNESSES:
INVENTOR
GEORGE G. GREENWOOD.
BY
ATTORNEYS

UNITED STATES PATENT OFFICE.

GEORGE G. GREENWOOD, OF INDIANAPOLIS, INDIANA.

STUD-MOUNTING FOR STEAM-BOILERS AND THE LIKE.

1,194,169.  Specification of Letters Patent.  Patented Aug. 8, 1916.

Application filed March 8, 1916. Serial No. 82,905.

*To all whom it may concern:*

Be it known that I, GEORGE G. GREENWOOD, a citizen of the United States, and a resident of Indianapolis, county of Marion, and State of Indiana, have invented a certain new and useful Stud-Mounting for Steam-Boilers and the like; and I do hereby declare that the following is a full, clear, and exact description thereof, reference being had to the accompanying drawings, in which like letters refer to like parts.

The object of this invention is the mounting of studs and bolts in steam boilers and in the wall plates of tanks containing fluid under pressure so that there will be absolute safety in renewing studs or bolts without reducing the pressure in the boiler or tank and to prevent leakage at the studs or bolts caused by the strain on them or by reason of improper fit or application, and thus prevent the corrosion of the plate around the stud or bolt caused by such leakage and to adapt the threads to suit any desired studs or bolts. Heretofore, studs and bolts have been secured directly to the plate of the boiler or tank and such manner of mounting the same has caused the annoyance, trouble and disadvantages above specified.

The chief feature of the invention consists in securing a socket or sleeve in the plate of the boiler or tank which is provided with internal threads through the outer portion of its thickness and the studs or bolts are threaded and screwed into said socket. Also a button or disk is inserted in the socket to prevent drilling through the inner end of the socket in case it becomes necessary to drill out the broken end of a stud or bolt for the purpose of renewing the same.

The full nature of the invention will be understood from the accompanying drawings and the following description and claims.

In the drawings, Figure 1 is an elevation of a small section of boiler plate with the stud mounting shown therein. Fig. 2 is a section on the line 2—2 of Fig. 1. Fig. 3 is a section on the line 3—3 of Fig. 2. Fig. 4 is an enlarged view of the inner portion of a socket, bolt, disk and washer, with the parts in condition before the bolt is screwed in tightly. Fig. 5 is the same after the bolt has been screwed in tightly.

To illustrate the general nature of the invention, there is shown herein a small portion 10 of a boiler plate or wall of any tank adapted to contain fluid under pressure. At various points where it may be necessary to secure bolts or studs for the purpose of supporting brackets or any other structures or for any other purposes, there is a hole at 11 made through the boiler plate and internally threaded to receive a tapered socket or sleeve 12. This socket is externally threaded from the inner end to the outer end and the outer end has an annular lip or flange 13 so that when the tapered socket or sleeve is screwed in tight, said flange can be battered down like a rivet head to make a steam tight joint between the socket and boiler plate. Said socket has a central hole or recess 14 in its outer end and extending partially but not entirely through it so that the inner end is closed and intact. This recess or hole is internally threaded to receive the threaded end of the stud or bolt 15. A typical stud is shown in Fig. 2, containing a middle portion 16, not threaded, but with both ends threaded. When inserted in place, a bracket 17 is mounted on the stud and it is held in place by a nut 18 on the outer end of the stud.

To prevent a partial drilling through the inner closed end of the socket 12, if it should become necessary to drill out the inner end of a broken stud, a case hardened disk 20 is inserted, being of slightly less diameter than the bore of the socket so that it will partially turn when the drill strikes it and prevent further operation of the drill. To hold the disk or button 21 in said socket, a lead washer 22 is placed against it. This lead washer when inserted, is substantially the same as the internal diameter of the socket so that it can be inserted, but when the stud or bolt is screwed down tightly against it, the lead will spread, as shown in Fig. 5, and its margins enter the threads of the socket so that it will not come out when replacing studs or bolts and will hold a disk or button in place.

With such arrangement, it is obvious that the studs or bolts can be removed or replaced while the boiler or tank is still under full pressure. Since the inner ends of the sockets are closed, there is no leakage around the studs or no strain on them and there is no corrosion of the plate around the studs caused by any leakage and the socket can be threaded to receive studs or bolts of any size. This arrangement preserves the life of the sleeve indefinitely; and while drilling out a stud or bolt, the sleeve will never be drilled or injured.

The invention claimed is:

1. The combination with the plate of a steam boiler or other tank under pressure, of a socket secured therein with a threaded opening extending partially therethrough, a stud or bolt removably secured in said socket, and a rotatable disk in said socket to prevent drills from boring through said socket while drilling out the ends of broken studs or bolts.

2. The combination with the plate of a steam boiler or other tank under pressure, of a socket secured therein with a threaded opening extending partially therethrough, a stud or bolt removably secured in said socket, a rotatable disk in said socket to prevent drills from boring through said socket while drilling out the end of a broken stud or bolt, and a washer of soft metal in said socket against said disk and adapted to spread into the thread of the socket when the bolt or stud is screwed tightly into the socket and against said washer.

In witness whereof, I have hereunto affixed my signature.

GEORGE G. GREENWOOD.